United States Patent Office 3,028,393
Patented Apr. 3, 1962

3,028,393
NOVEL 1-(3-INDOYL)-1,2-ALKANEDIOLS AND SUBSTITUTED HYDROXYMETHYL 3-INDOLYL KETONES
Jacob Szmuszkovicz, Portage Township, Kalamazoo County, Mich., assignor to The Upjohn Company, Kalamazoo, Mich., a corporation of Delaware
No Drawing. Filed May 11, 1960, Ser. No. 28,253
16 Claims. (Cl. 260—319)

This invention relates to novel derivatives of indole and to processes for their preparation and is more particularly concerned with 1-(3-indolyl)-1,2-alkanediols, substituted-hydroxymethyl 3-indolyl ketones, and with processes for their preparation.

The novel compounds of the invention can be represented by the formula:

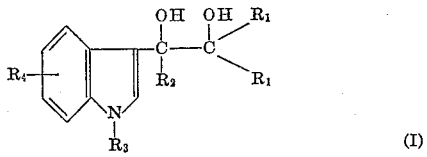

wherein $R_1$ is selected from the class consisting of phenyl and alkyl containing from 1 to 4 carbon atoms, inclusive, $R_2$ is alkyl containing from 1 to 4 carbon atoms, inclusive, $R_3$ is selected from the class consisting of hydrogen and alkyl containing from 1 to 4 carbon atoms, inclusive, and $R_4$ is selected from the class consisting of hydrogen, hydroxy, alkoxy containing from 1 to 4 carbon atoms, inclusive, and benzyloxy.

The term "alkyl containing from 1 to 4 carbon atoms, inclusive," as used in the specification and claims means methyl, ethyl, propyl, butyl, and isomeric forms thereof. The term "alkoxy containing from 1 to 4 carbon atoms, inclusive," as used in the specification and claims means methoxy, ethoxy, propoxy, butoxy, and isomeric forms thereof.

The novel compounds of the invention show valuable pharmacological activities in mammals and animals of economic value. Illustratively, the novel compounds of the invention possess activity as central nervous system depressants. For example, the compounds 2-(3-indolyl)-3-methyl-2,3-butanediol and 2-methyl-3-(1-methyl-3-indolyl)-2,3-butanediol exhibit hypnotic and sedative activity in laboratory animals such as rats, mice, and the like.

In addition, the compounds of the invention exhibit high absorption of radiation in the wavelength range of 280–300 millimicrons and accordingly can be employed as effective sun screens when incorporated in suitable vehicles such as transparent film forming compositions and oils.

Further, the compounds of the invention can be reacted with chloroacetyl chloride in the presence of pyridine and like tertiary bases to give the corresponding chloroacetates. By employing the chloroacetyl chloride and compound having the Formula I in equimolar proportions there are obtained the corresponding monochloroacetates while, by employing at least 2 moles of chloroacetyl chloride per mole of Compound I, there are obtained the corresponding bis(chloroacetates). The chloroacetates so obtained can then be reacted with an alkali metal thiocyanate such as sodium thiocyanate to yield the corresponding thiocyanoacetates. The thiocyanoacetates so obtained are useful as insecticides.

The novel compounds of the invention having the Formula I in which $R_4$ is other than hydroxy, can be prepared readily from the corresponding compounds having the following formula:

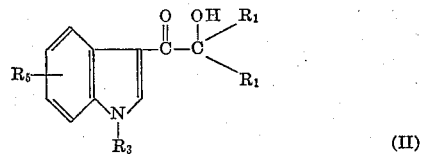

wherein $R_1$ and $R_3$ have the significance hereinbefore defined and $R_5$ represents hydrogen, alkoxy, or benzyloxy.

The following methods can be employed to convert a compound having the Formula II to the desired compound having the Formula I:

(1) Where $R_1$ in the Compound II represents alkyl only and the groups $R_3$ and $R_5$ have the significance hereinbefore defined, the Compound II can be converted to the corresponding compound having the Formula I by treatment with an ethereal solution of alkylmagnesium halide having the formula $R_2MgHal$ where $R_2$ has the significance hereinbefore defined and Hal represents a halogen atom, preferably iodine or bromine. The reaction is carried out advantageously in an inert solvent such as ether, benzene, toluene, xylene, tetrahydrofuran, and the like. Preferably, a solution of the Compound II in the inert solvent is added slowly to a solution of the Grignard reagent in the same or a different solvent, with cooling, if necessary, to maintain the temperature of the reaction within the range of 25 to 35° C. After the addition is complete the reaction mixture is heated, preferably under reflux for several hours, before being cooled and decomposed by conventional procedures, for example, by treatment with aqueous ammonium chloride solution with cooling. The desired product is isolated and purified by conventional procedures, for example, by solvent extraction followed by recrystallization. The Grignard reagent and the Compound II employed in the above reaction can be present in stoichiometric proportions but the presence of an excess of Grignard reagent is preferred.

If $R_3$ in the starting Compound II represents hydrogen, the resulting compound having the Formula I in which $R_3$ also represents hydrogen can be converted to the corresponding compound of Formula I in which $R_3$ represents alkyl by means known in the art for the N-alkylation of indoles. For example, the alkylation can be effected by treatment with the appropriate dialkyl sulfate in the presence of a base such as sodium hydroxide, potassium hydroxide, and the like, or by treatment with the appropriate alkyl halide in the presence of a base such as potassium carbonate, sodium methoxide, sodium ethoxide, and the like.

(2) Where $R_1$ in the Compound II represents either phenyl or alkyl and the groups $R_3$ and $R_5$ have the significance hereinbefore defined, the Compound II can be converted to the corresponding compound having the Formula I by reaction with an ethereal solution of the appropriate alkyllithium compound $R_2Li$ where $R_2$ has the significance hereinbefore defined. The reaction is preferably carried out in the presence of an inert solvent such as ether, benzene, toluene, xylene, and the like. The alkyllithium is prepared according to the method of Van Dorp and Arens (Rec. trav. chim. 65, 338, 1946) and advantageously a solution of the alkyllithium in the inert solvent is added slowly, under an atmosphere of nitrogen, to a solution of the Compound II in the same or a different inert solvent. The reaction mixture is subsequently heated, for example, at the reflux temperature of the mixture, for several hours before being cooled and decomposed by conventional procedures, for example, by treatment with water. The desired product is isolated from the reaction mixture by conventional procedures, for example, by solvent extraction. The isolated product is purified by conventional procedures, for example, by chromatography. The reactants in the above reaction can be employed in stoichiometric amounts but the presence of an excess of the alkyllithium is preferred.

Again, if $R_3$ in the starting Compound II represents hydrogen, the resulting compound having the Formula I in which $R_3$ also represents hydrogen can be converted to the corresponding compound of Formula I in which $R_3$ represents alkyl by means known in the art, for example, by the N-alkylation methods hereinbefore described.

The compounds of the invention having the Formula I wherein $R_4$ represents hydroxy and $R_1$, $R_2$, and $R_3$ have the significance hereinbefore defined can be prepared from the corresponding Compound I in which $R_4$ represents alkoxy or benzyloxy using methods well-known in the art for dealkylation of an alkoxy group or debenzylation of a benzyloxy group. For example, treatment of a compound having the Formula I in which $R_4$ is alkoxy with pyridine hydrochloride using the procedure of Prey (Ber. 74B, 1219, 1941) yields the corresponding Compound I in which $R_4$ is hydroxy. Similarly, hydrogenolysis of a compound having the Formula I in which $R_4$ is benzyloxy, in the presence of a palladium catalyst as disclosed in U.S. Patent 2,708,197, yields the desired Compound I in which $R_4$ is hydroxy.

The compounds having the Formula II above, which are employed as intermediates in the preparation of the compounds of the invention having Formula I, are themselves novel compounds. They can be prepared in a convenient manner by the action of an ethereal solution of the appropriate Grignard reagent $R_1MgHal$, wherein $R_1$ and Hal have the significance hereinbefore defined, on a 3-indoleglyoxylate having the formula:

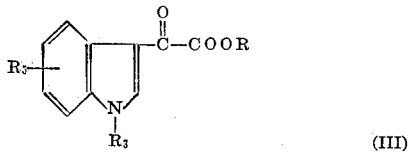

wherein $R_3$ and $R_5$ have the significance hereinbefore defined and R represents alkyl, preferably methyl or ethyl. The reaction between the compound of Formula III and the Grignard reagent is preferably carried out in the presence of an inert solvent such as ether, benzene, toluene, xylene, tetrahydrofuran, and the like. Preferably the reaction is carried out by adding the ester (III) to the Grignard reagent slowly over an extended period of time so that the temperature does not rise substantially above about 25 to 35° C. After the addition is complete the reaction can be completed by elevating the temperature, for example, by heating under reflux for several hours. The reaction mixture is decomposed by conventional procedures, for example, by treating with aqueous ammonium chloride solution whilst cooling. The desired compound having the Formula II can be isolated from the reaction mixture by conventional procedures, for example, by solvent extraction, and can be purified by conventional procedures, for example, by recrystallization.

The molar proportion of Grignard reagent to compound having the Formula III employed in the above reaction is advantageously of the order of 2:1 to 5:1, and preferably is of the order of 4:1.

It is to be noted that by carrying out the above reaction using a Grignard reagent $R_1MgHal$, wherein $R_1$ represents alkyl, in a proportion of greater than 5 moles per mole of the ester (III), advantageously of the order of 7:1 to 9:1, and preferably in a proportion of about 8 moles of Grignard per mole of the ester (III), it is possible to pass directly from the ester (III) to the corresponding Compound I wherein $R_1$ is alkyl and $R_2$ and $R_3$ have the significance hereinbefore defined, and $R_4$ represents hydrogen, alkoxy, and benzyloxy, but not hydroxy. This forms a valuable alternative method of preparing the compounds of the invention of Formula I wherein $R_1$ represents alkyl.

The compounds having the Formula III which are employed as starting materials in the above synthesis can themselves be prepared readily by reaction of the appropriately substituted indole having the formula:

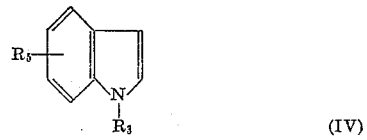

wherein $R_3$ and $R_5$ have the significance hereinbefore defined, with oxalyl chloride to give the corresponding 3-indoleglyoxylyl chloride using the procedure described by Speeter and Anthony (J. Amer. Chem. Soc. 76, 6208, 1954) for the preparation of 5-benzyloxy-3-indoleglyoxylyl chloride. The 3-indoleglyoxylyl chloride so obtained is converted to the corresponding alkyl ester by reaction with the appropriate alkanol, using the procedure described in British Patent 778,823 for the preparation of ethyl 3-indoleglyoxylate.

The preparation of the compounds having the Formula III can also be carried out by condensing a compound having the Formula IV with the appropriate dialkyl oxalate using the procedure described by Elks et al. (J. Chem. Soc. 1944, 629) for the preparation of ethyl 3-indoleglyoxylate.

The compounds having the Formula IV which are employed as starting materials in the preparation of the compounds having the Formula III are for the most part known and can be prepared by methods well-known in the art as follows:

(1) The 1-alkylindoles (IV; $R_3$=alkyl; $R_5$=H) can be prepared by reacting indole with the appropriate alkyl halide in the presence of an alkali-metal alkoxide as described by Baker (J. Chem. Soc. 1940, 458).

(2) The 4-, 5-, and 7-alkoxyindoles (IV; $R_3$=H; $R_5$=alkoxy) can be prepared from the appropriate alkoxy-2-nitrotoluene using the procedure described by Blaikie et al. (J. Chem. Soc. 1924, 296) for the preparation of 4-, 5-, and 7-methoxyindoles. The 6-alkoxyindoles can be prepared by the procedure described by Kermack et al. (J. Chem. Soc. 1921, 1602).

(3) The 4-, 5-, 6-, and 7-alkoxy-1-alkylindoles (IV; $R_3$=alkyl; $R_5$=alkoxy) can be prepared by 1-alkylation of the appropriate 1-unsubstituted alkoxyindoles using the procedure described in (1) above.

(4) The 4-, 5-, 6-, and 7-benzyloxyindoles (IV; $R_3$=H; $R_5$=benzyloxy) can be prepared by the following procedure:

(a) Benzylating 3-hydroxy-2-nitrobenzaldehyde (Hodgson et al., J. Chem. Soc. 1925, 877), 4-hydroxy-2-nitrobenzaldehyde (Sachs, Ber. 39, 2758), 5-hydroxy- and 6-hydroxy-2-nitrobenzaldehyde (Beer et al., J. Chem. Soc., 1948, 1605) with a benzyl halide to produce the corresponding benxyloxy-2-nitrobenzaldehyde; and (b) Reacting the benzyloxy-2-nitrobenzaldehyde with a 1-nitroalkane in the presence of an alkalimetal hydroxide and at a temperature between about 0° C. and about −40° C., preferably at about −15° C., to produce a benzyloxy-2-nitro-α-[1-(1-nitroalkyl)]benzyl alcohol alkali-metal salt, and thereafter acidifying the thus-produced salt to yield the corresponding benzyloxy-2-nitro-α-[1-(1-nitroalkyl)]benzyl alcohol; and (c) Dehydrating the benzyloxy-2-nitro-α-[1-(1-nitroalkyl)]benzyl alcohol by reacting the alcohol with an aliphatic acid anhydride, for example, acetic anhydride, at a temperature between about 50° C. and about 150° C., preferably at about 80° C., to produce a benzyloxy-β,2-dinitrostyrene; and (d) Subjecting the benzyloxy-β,2-dinitrostyrene to reductive cyclization by reacting the styrene with powdered iron in an organic acid medium, such as acetic, propionic, butyric acid or the like, at a temperature between about 50° C. and about 120° C. to produce the corresponding benzyloxyindole.

(5) The 4-, 5-, 6-, and 7-benzyloxy-1-alkylindoles (IV; $R_3$=alkyl; $R_5$=benzyloxy) are prepared by alkylation of the appropriate 1-unsubstituted benzyloxyindoles using the procedure described in (1) above.

The novel compounds of the invention can be combined with solid or liquid pharmaceutical carriers and formulated in the form of tablets, powder packets, or capsules, using starch and like excipients, or dissolved or suspended in suitable solvents or vehicles, for oral or parenteral administration.

The following examples are illustrative of the processes and products of the present invention, but are not to be construed as limiting.

EXAMPLE 1.—2-METHYL-3-(1-METHYL-3-INDOLYL)-2,3-BUTANEDIOL

A. *2-Hydroxy-1-(3-Indolyl)-2-Methyl-1-Propanone*

A solution of 86.88 g. (0.4 mole) of ethyl 3-indoleglyoxylate (British Patent 778,823) in 2 l. of tetrahydrofuran was added during 1 hr. to a solution of methylmagnesium iodide, prepared from 227 g. (1.6 moles) of methyl iodide and 40.8 g. (1.68 moles) of magnesium, in 1 l. of ether. After the addition was complete the mixture was refluxed for 2 hr. and the resulting suspension was allowed to stand at approximately 25° C. for 2 days. The mixture was then decomposed by the careful addition, with cooling, of a solution of 214 g. of ammonium chloride in 1 l. of water. The organic layer was separated and the aqueous layer was extracted with four 250-ml. portions of ether. The combined organic layer and ethereal extracts were washed successively with water, dilute aqueous sodium thiosulfate solution, water, and saturated aqueous sodium chloride solution before being dried over anhydrous sodium sulfate. The dried solution was filtered and the filtrate was evaporated. The oily residue was dissolved in benzene whereupon crystalline material separated from the solution and was isolated by filtration. There was thus obtained 40.0 g. of 2-hydroxy-1-(3-indolyl)-2-methyl-1-propanone in the form of a crystalline solid having a melting point of 164.5 to 165.5° C. (unchanged by successive recrystallizations from a mixture of benzene and methanol and a mixture of acetone and petroleum ether). A second crop of material (6.51 g.) having a melting point of 161 to 163.5° C. was isolated by concentration of the benzene mother liquors.

The ultraviolet absorption spectrum of the compound (in ethanol) exhibited maxima at 243, 255.5, and 300 millimicrons. The ultraviolet absorption spectrum of the compound (in 0.01 N alcoholic potassium hydroxide) exhibited maxima at 243, 262, 301, and 336 millimicrons. The infrared absorption spectrum of the compound mineral oil mull) exhibited maxima at 3325, 3200, 1607, 1582, 1562, 1510, and 1497 reciprocal centimeters.

*Analysis.*—Calcd. for $C_{12}H_{13}NO_2$: C, 70.91; H, 6.45; N, 6.89. Found: C, 71.13; H, 6.27; N, 6.81.

B. *2-Hydroxy-1-(1-Methyl-3-Indolyl)-2-Methyl-1-Propanone*

A solution of 2.03 g. (0.01 mole) of 2-hydroxy-1-(3-indolyl)-2-methyl-1-propanone in 100 ml. of acetone was added to a solution of 11.2 g. (0.2 mole) of potassium hydroxide in 50 ml. of water. To the resulting solution was added slowly, over a period of 15 min., 9.5 ml. (0.1 mole) of dimethyl sulfate and the mixture was stirred for 35 min. after the addition was complete. The resulting mixture was evaporated at 50° C. under reduced pressure until the residue solidified. The solid residue was triturated with 150 ml. of water and the insoluble material was isolated by filtration and recrystallized from benzene. There was thus obtained 1.8 g. of 2- hydroxy-1-(1-methyl-3-indolyl)-2-methyl-1-propanone in the form of a crystalline solid having a melting point of 142 to 143° C. The ultraviolet absorption spectrum of the compound (in ethanol, and also in 0.01 N alcoholic potassium hydroxide) exhibited maxima at 211, 246, and 305 millimicrons. The infrared absorption spectrum of the compound (mineral oil mull) exhibited maxima at 3420, 1615, and 1610 reciprocal centimeters.

*Analysis.*—Calcd. for $C_{13}H_{15}NO_2$: C, 71.86; H, 6.96; N, 6.45. Found: C, 71.96; H, 7.13; N, 6.60.

C. *2-Methyl-3-(1-Methyl-3-Indolyl)-2,3-Butanediol*

A solution of 10.0 g. (0.0461 mole) of 2-hydroxy-1-(1-methyl-3-indolyl)-2-methyl-1-propanone in 280 ml. of warm benzene was added during 20 min. to a solution of methylmagnesium iodide, prepared from 65.4 g. (0.461 mole) of methyl iodide and 11.8 g. (0.484 mole) of magnesium, in 600 ml. of ether. After the addition was complete the mixture was heated under reflux for a total of 19 hr. before being cooled in ice and decomposed by the addition of a solution of 67 g. of ammonium chloride in 390 ml. of water. The organic layer was separated and the aqueous layer was extracted with three 100-ml. portions of ether. The combined organic layer and ethereal extracts were washed successively with water, dilute aqueous sodium thiosulfate solution, water, and saturated aqueous sodium chloride solution. The washed solution was dried over anhydrous sodium sulfate. The dried solution was filtered and the filtrate was evaporated at 30° C. under reduced pressure. The oily residue was dissolved in 10 ml. of ether and the solution so obtained was allowed to stand at 4° C. The solid which separated was isolated by filtration to obtain 3.4 g. of material melting at 87 to 88° C. The filtrate was evaporated to dryness and the residue was dissolved in 20 ml. of benzene. The resulting solution was chromatographed on a column containing 180 g. of hydrated magnesium silicate (Florisil). The column was eluted with 7 l. of a mixture of hexanes (Skellysolve B) containing 3% of acetone. The eluate was evaporated to dryness and the residue was recrystallized from a mixture of ether and Skellysolve B to give 1.58 g. of material having a melting point of 89 to 90.5° C. This material was combined with the material having melting point of 87 to 88° C. isolated as described above and a sample of the combined material was recrystallized from a mixture of ether and petroleum ether (boiling range 30 to 60° C.). There was thus obtained 2-methyl-3-(1-methyl-3-indolyl)-2, 3-butanediol in the form of a crystalline solid having a melting point of 90.5 to 91° C. The ultraviolet spectrum of the compound (in ethanol) exhibited maxima at 223, f 280, 287, and f 296 millimicrons. The infrared absorption spectrum of the compound (mineral oil mull) exhibited maxima at 3380, 1610, 1565, 1540, and 1480 reciprocal centimeters.

*Analysis.*—Calcd. for $C_{14}H_{19}NO_2$: C, 72.07; H, 8.21; N, 6.00. Found: C, 72.20; H, 7.97; N, 6.23.

EXAMPLE 2.—2-METHYL-3-(1-METHYL-3-INDOLYL)-2, 3-BUTANEDIOL

A solution of methyllithium was prepared from 16.5 g. (2.38 moles) of lithium and 153 g. (1.08 moles) of methyl iodide in 1800 ml. of ether. The solution so obtained was added over a period of 15 min. to a solution of 23.5 g. (0.108 mole) of 2-hydroxy-1-(1-methyl-3-indolyl)-2- methyl-propane (prepared as described in Example 1, Part B) in 1080 ml. of benzene. The resulting mixture was heated under reflux for 1.5 hr. before being cooled in ice and decomposed by the addition of 540 ml. of water. The organic layer was separated and the aqueous layer was extracted with two 100-ml. portions of benzene. The combined organic layer and benzene extracts were washed successively with water, dilute aqueous sodium thiosulfate solution, and saturated aqueous sodium chloride solution. The washed solution was dried over anhydrous sodium sulfate and the dried solution was filtered. The filtrate was evaporated under reduced pressure. The residue was recrystallized from ether to give 13.9 g. of material having a melting point of 87.5 to 89.5° C. A second crop (6.87 g.) having a melting point of 88–90° C. was obtained by the addition of petroleum ether to the mother liquors. There was thus obtained 2-methyl-3-(1-methyl-3-indolyl)-2,3-buatnediol in the form of a crystalline solid identical with the material prepared in Example 1, Part C.

EXAMPLE 3.—2-(3-INDOLYL)-3-METHYL-2,3-BUTANEDIOL

A solution of 32.6 g. (0.15 mole) of ethyl 3-indoleglyoxylate in 750 ml. of tetrahydrofuran was added during 1.75 hr. to a solution of methylmagnesium iodide prepared from 170 g. (1.2 moles) of methyl iodide and 30.6 g. (1.251 moles) of magnesium in 750 ml. of ether. The resulting suspension was stirred and refluxed for 4 hr. before being cooled in ice and decomposed by the addition of a solution of 160.5 g. of ammonium chloride in 750 ml. of water. The organic layer was separated and the aqueous layer was extracted with four 125-ml. portions of ether. The combined organic layer and ethereal extracts were washed successively with water, dilute aqueous sodium thiosulfate solution, water, and saturated aqueous sodium chloride solution. The washed solution was dried over anhydrous sodium sulfate and evaporated to dryness. The residue was dissolved in 50 ml. of benzene and allowed to stand overnight. The solid which separated was isolated by filtration. There was thus obtained 17.35 g. of crude product having a melting point of 133 to 136° C. This material was recrystallized from a mixture of benzene and methanol. There was thus obtained 2-(3-indolyl)-3-methyl-2,3-butanediol in the form of a crystalline solid having a melting point of 138.5 to 139.5° C. which was unchanged on further recrystallization from benzene. The ultraviolet spectrum of the compound (in ethanol) exhibited maxima at 221, 274, 281, and 289 millimicrons. The infrared spectrum of the compound (mineral oil mull) exhibited maxima at 3500, 3400, 3220, 1617, 1570, 1530, 1497, 1112, and 1067 reciprocal centimeters.

*Analysis.*—Calcd. for $C_{13}H_{17}NO_2$: C, 71.20; H, 7.82; N, 6.39. Found: C, 71.59; H, 7.67; N, 6.23.

EXAMPLE 4.—1,1-DIPHENYL-2-(3-INDOLYL)-1,2-PROPANEDIOL

A. *Hydroxydiphenylmethyl 3-Indolyl Ketone and Solvates Thereof*

A solution of 173.8 g. (0.8 mole) of ethyl 3-indoleglyoxylate in 3 l. of tetrahydrofuran was added to a solution of phenylmagnesium bromide [prepared from 502.4 g. (3.2 moles) of bromobenzene and 81.6 g. (3.36 moles) of magnesium in 2400 ml. of ether] with stirring during 70 min. The resulting suspension was heated under reflux for 2 hr. and then allowed to stand overnight at approximately 25° C. The reaction mixture was then cooled in ice and decomposed by the addition of a solution of 428 g. of ammonium chloride in 2 l. of water. The organic layer was separated and the aqueous layer was extracted with three 200-ml. portions of ether. The combined organic layer and ethereal extracts were washed successively with water, dilute aqueous sodium thiosulfate solution, water, and saturated aqueous sodium chloride solution. The washed solution was then dried over anhydrous sodium sulfate and the dried solution was filtered. The filtrate was evaporated at 40° C. under reduced pressure and the solid residue was recrystallized from 200 ml. of methanol to obtain 168 g. of crystalline material having a melting point of 143 to 149° C. The methanol filtrate was evaporated to dryness and the residue was treated with 150 ml. of ether. The solid which separated was isolated by filtration to obtain 30.4 g. of crystalline material. The two crops of material thus obtained were combined and recrystallized twice from methanol. There was thus obtained hydroxydiphenylmethyl 3-indolyl ketone in the form of a crystalline solid having a melting point of 155 to 156° C. The ultraviolet spectrum of the compound (in ethanol) exhibited maxima at 246, 264, and 308 millimicrons. The ultraviolet spectrum of the compound (in 0.01 N alcoholic potassium hydroxide) exhibited maxima at 246, 267, of the compound (mineral oil mull) exhibited maxima f 276, 310, and 340 millimicrons. The infrared spectrum at 3370, 3300, 1590, 1575, 1560, and 1488 reciprocal centimeters.

*Analysis.*—Calcd. for $C_{22}H_{17}NO_2$: C, 80.71; H, 5.24; N, 4.28. Found: C, 80.55; H, 5.31; N, 4.34.

A sample of the hydroxydiphenylmethyl 3-indolyl ketone obtained as described above was recrystallized from acetone to give an acetone solvate in the form of a crystalline solid which sintered at 92° C. and then melted at 151.5 to 153° C.

*Analysis.*—Calcd. for $C_{22}H_{17}NO_2 \cdot C_3H_6O$: C, 77.90; H, 6.01; N, 3.63. Found: C, 78.28; H, 6.01; N, 3.53.

A sample of the hydroxydiphenylmethyl 3-indolyl ketone obtained as described above was recrystallized from a mixture of benzene and ether to produce an ether solvate in the form of a crystalline solid having a melting point of 96 to 98° C. (with effervescence), a resolidifying point of 108° C., and a second melting point of 145 to 146° C.

*Analysis.*—Calcd. for $C_{22}H_{17}NO_2 \cdot \frac{1}{2} C_4H_{10}O$: C, 79.09; H, 6.09; N, 3.84; O, 10.98. Found: C, 79.31; H, 5.88; N, 3.50; O, 11.27.

B. *1,1-Diphenyl-2-(3-Indolyl)-1,2-Propanediol*

A solution of methyllithium was prepared from 12.5 ml. (0.2 mole) of methyl iodide and 3.06 g. (0.44 mole) of lithium wire in 150 ml. of ether. The solution so obtained was added, under nitrogen, during a period of 10 min. to a stirred solution of 6.54 g. (0.02 mole) of hydroxydiphenylmethyl 3-indolyl ketone in 200 ml. of benzene. After the addition was complete the mixture was heated under reflux for 2 hr. The precipitate, which was formed initially, dissolved and the solution finally turned dark brown. The resulting solution was cooled in ice and decomposed by the addition of 100 ml. of water. The organic layer was separated and the aqueous layer was extracted with two 100-ml. portions of benzene. The combined organic layer and washings were washed successively with water, dilute aqueous sodium thiosulfate solution, and saturated aqueous sodium chloride solution. The washed solution was dried over anhydrous sodium sulfate and the dried solution was filtered. The filtrate was evaporated at 30° C. under reduced pressure. The residue was dissolved in 7 ml. of benzene and chromatographed on a column containing 220 g. of hydrated aluminum silicate (Florisil). The column was eluted with a mixture of hexanes (Skellysolve B) containing 5% of acetone. The first 2 l. of eluate was discarded and the next 3,250 ml. of eluate was evaporated to dryness. There was thus obtained 5.23 g. of a solid having a melting point of 78° C. (with effervescence). This solid was recrystallized from chloroform and then from benzene. There was thus obtained 1,1-diphenyl-2-(3-indolyl)-1,2-propanediol in the form of a crystalline solid having a melting point of 105° C. (with effervescence). The ultraviolet absorption spectrum of the compound (in ethanol, and also in 0.01 N alcoholic potassium hydroxide) exhibited maxima at 220, 281, and 289 millimicrons. The infrared absorption spectrum of the compound (mineral oil mull) exhibited maxima at 3550 sh, 3490, 3380, 1605, 1542, 1500, 1470, 1195, 1175, and 1125 reciprocal centimeters.

Analysis.—Calcd. for $C_{23}H_{21}NO_2$: C, 80.44; H, 6.16; N, 4.08. Found: C, 80.66; H, 6.35; N, 4.26.

EXAMPLE 5.—1,1-DIPHENYL-2-(1-METHYL-3-INDOLYL)-1,2-PROPANEDIOL

A. *Hydroxydiphenylmethyl 1-Methyl-3-Indolyl Ketone*

(i) To a solution of 0.575 g. (0.025 mole) of sodium in 20 ml. of methanol was added 1.9 g. (0.0049 mole) of hydroxydiphenylmethyl 3-indolyl ketone acetone solvate (prepared as described in Example 4, Part A). The resulting solution was heated under reflux for 15 min. and then allowed to cool. The solution was treated at about 25° C. with 1.55 ml. (0.025 mole) of methyl iodide and the mixture was heated under reflux for 70 min. The mixture was then cooled to about 25° C., treated with 1 ml. of methyl iodide and then heated under reflux for 2 hrs. The resulting mixture was evaporated to dryness and the residue was treated with 50 ml. of water. The insoluble material was isolated by filtration, washed with water, and recrystallized from 50 ml. of methanol. There was thus obtained hydroxydiphenylmethyl 1-methyl-3-indolyl ketone in the form of a crystalline solid having a melting point of 176.5 to 179° C. The ultraviolet absorption spectrum of the compound (in ethanol, and also in 0.01 N alcoholic potassium hydroxide) exhibited maxima at 249, f 264, and 312 millimicrons. The infrared absorption spectrum of the compound (mineral oil mull) exhibited maxima at 3420, 1630 sh, 1612, 1575, and 1513 reciprocal centimeters.

Analysis.—Calcd. for $C_{23}H_{19}NO_2$: C, 80.91; H, 5.61; N, 4.10. Found: C, 81.27; H, 5.89; N, 4.06.

(ii) A solution of 3.27 g. (0.009 mole) of hydroxydiphenylmethyl 3-indolyl ketone ether solvate (prepared as described in Example 4, Part A) in 100 ml. of acetone was added to a solution of 11.2 g. (0.2 mole) of potassium hydroxide in 50 ml. of water. To the resulting solution was added, over a period of 10 min., 9.5 ml. (0.1 mole) of dimethyl sulfate. The resulting mixture was stirred for a further 30 min. and was then evaporated at 50° C. under reduced pressure to remove the acetone. The resulting aqueous slurry was filtered and the isolated solid was washed with water and recrystallized from 100 ml. of methanol. There was thus obtained 2.1 g. of hydroxydiphenylmethyl 1-methyl-3-indolyl ketone in the form of a crystalline solid having a melting point of 176–179.5° C., identical with the material obtained as described in (i) above.

B. *1,1-Diphenyl-2-(1-Methyl-3-Indolyl)-1,2-Propanediol*

Using the procedure described in Example 4, Part B, but substituting hydroxydiphenylmethyl 1-methyl-3-indolyl ketone (prepared as described in Part A above) for hydroxydiphenylmethyl 3-indolyl ketone, there was obtained 1,1-diphenyl-2-(1-methyl-3-indolyl)-1,2-propanediol.

EXAMPLE 6.—3-BUTYL-2-(1-METHYL-3-INDOLYL)-2,3-HEPTANEDIOL

A. *2-Butyl-2-Hydroxy-1-(3-Indolyl)-1-Hexanone*

Using the procedure described in Example 1, Part A, but substituting butylmagnesium iodide for methylmagnesium iodide, there was obtained 2-butyl-2-hydroxy-1-(3-indolyl)-1-hexanone.

B. *2-Butyl-2-Hydroxy-1-(1-Methyl-3-Indolyl)-1-Hexanone*

Using the procedure described in Example 1, Part B, but substituting 2-butyl-2-hydroxy-1-(3-indolyl)-1-hexanone for 2-hydroxy-1-(3-indolyl)-2-methyl-1-propanone, there was obtained 2-butyl-2-hydroxy-1-(1-methyl-3-indolyl)-1-hexanone.

C. *3-Butyl-2-(1-Methyl-3-Indolyl)-2,3-Heptanediol*

Using the procedure described in Example 1, Part C, but substituting 2-butyl-2-hydroxy-1-(1-methyl-3-indolyl)-1-hexanone for 2-hydroxy-1-(1-methyl-3-indolyl)-2-methyl-1-propanone, there was obtained 3-butyl-2-(1-methyl-3-indolyl)-2,3-heptanediol.

EXAMPLE 7.—2-(3-INDOLYL)-3-ISOPROPYL-4-METHYL-2,3-PENTANEDIOL

A. *2-Hydroxy-1-(3-Indolyl)-2-Isopropyl-3-Methyl-1-Butanone*

Using the procedure described in Example 1, Part A, but substituting isopropylmagnesium iodide for methylmagnesium iodide, there was obtained 2-hydroxy-1-(3-indolyl)-2-isopropyl-3-methyl-1-butanone.

B. *2-(3-Indolyl)-3-Isopropyl-4-Methyl-2,3-Pentanediol*

Using the procedure described in Example 1, Part C, but substituting 2-hydroxy-1-(3-indolyl) - 2 - isopropyl-3-methyl-1-butanone for 2-hydroxy-1-(1-methyl-3-indolyl)-2-methyl-1-propanone, there was obtained 2-(3-indolyl)-3-isopropyl-4-methyl-2,3-pentanediol.

EXAMPLE 8.—3-ETHYL-2-(3-INDOLYL)-2,3-PENTANEDIOL

A. *2-Ethyl-2-Hydroxy-1-(3-Indolyl)-1-Butanone*

Using the procedure described in Example 1, Part A, but substituting ethylmagnesium iodide for methylmagnesium iodide, there was obtained 2-ethyl-2-hydroxy-1-(3-indolyl)-1-butanone.

B. *3-Ethyl-2-(3-Indolyl)-2,3-Pentanediol*

Using the procedure described in Example 1, Part C, but substituting 2-ethyl - 2 - hydroxy-1-(3-indolyl)-1-butanone for 2-hydroxy-1-(1-methyl - 3 - indolyl)-2-methyl-1-propanone, there was obtained 3-ethyl-2-(3-indolyl)-2,3-pentanediol.

EXAMPLE 9.—2-METHYL-3-(1-METHYL-3-INDOLYL)-2,3-PENTANEDIOL

Using the procedure described in Example 1, Part C, but substituting ethylmagnesuim iodide for methylmagnesium iodide, there was obtained 2-methyl-3-(1-methyl-3-indolyl)-2,3-pentanediol.

EXAMPLE 10.—2,4-DIMETHYL-3-(1-METHYL-3-INDOLYL)-2,3-PENTANEDIOL

Using the procedure described in Example 1, Part C, but substituting isopropylmagnesium iodide for methylmagnesium iodide, there was obtained 2,4-dimethyl-3-(1-methyl-3-indolyl)-2,3-pentanediol.

EXAMPLE 11.—2,4-DIMETHYL-3-(1-METHYL-3-INDOLYL)-2,3-HEXANEDIOL

Using the procedure described in Example 1, Part C, but substituting sec-butylmagnesium iodide for methylmagnesium iodide, there was obtained 2,4-dimethyl-3-(1-methyl-3-indolyl)-2,3-hexanediol.

EXAMPLE 12.—3-(5-BENZYLOXY-3-INDOLYL)-2-METHYL-2,3-BUTANEDIOL

A. *1-(5-Benzyloxy-3-Indolyl)-2-Hydroxy-2-Methyl-1-Propanone*

Using the procedure described in Example 1, Part A, but substituting ethyl 5-benzyloxy-3-indoleglyoxylate [prepared by reacting 5-benzyloxy-3-indoleglyoxylyl chloride (Speeter and Anthony, supra) with ethanol as described in British Patent 778,823] for ethyl 3-indoleglyoxylate, there was obtained 1-(5-benzyloxy-3-indolyl)-2-hydroxy-2-methyl-1-propanone.

B. *3-(5-Benzyloxy-3-Indolyl)-2-Methyl-2,3-Butanediol*

Using the procedure described in Example 1, Part C, but substituting 1-(5-benzyloxy - 3 - indolyl)-2-hydroxy-2-methyl-1-propanone for 2-hydroxy-1-(1-methyl-3-indolyl)-2-methyl-1-propanone, there was obtained 3-(5-benzyloxy-3-indolyl)-2-methyl-2,3-butanediol.

EXAMPLE 13.—3-(5-HYDROXY-3-INDOLYL)-2-METHYL-2,3-BUTANEDIOL 3-(5-benzyloxy-3-indolyl)-2-methyl-2,3-butanediol (prepared as described in Example 12) was dissolved in ethanol and treated with hydrogen in the presence of 10% palladium-on-charcoal catalyst according to the procedure described in U.S. Patent 2,708,197. There was thus obtained 3-(5-hydroxy-3-indolyl)-2-methyl-2,3-butanediol.

EXAMPLE 14.—3-(5-METHOXY-3-INDOLYL)-2-METHYL-2,3-BUTANEDIOL

A. *1-(5-Methoxy-3-Indolyl)-2-Hydroxy-2-Methyl-1-Propanone*

Using the procedure described in Example 1, Part A, but substituting ethyl 5-methoxy-3-indoleglyoxylate [prepared from 5-methoxyindole (Blaikie et al., supra) by reaction with oxalyl chloride using the procedure described by Speeter and Anthony, supra, and reaction of the 5-methoxy-3-indoleglyoxylyl chloride so obtained with ethanol according to the procedure described in British Patent 778,823] for ethyl 3-indoleglyoxylate, there was obtained 1-(5-methoxy-3-indolyl)-2-hydroxy-2-methyl-1-propanone.

B. *3-(5-Methoxy-3-Indolyl)-2-Methyl-2,3-Butanediol*

Using the procedure described in Example 1, Part C, but substituting 1-(5-methoxy-3-indolyl)-2-hydroxy-2-methyl - 1 - propanone for 2 - hydroxy - 1 - (1 - methyl-3-indolyl)-2-methyl-1-propanone, there was obtained 3-(5-methoxy-3-indolyl)-2-methyl-2,3-butanediol.

I claim:
1. A compound having the formula:

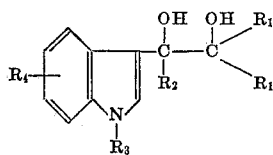

wherein $R_1$ is selected from the class consisting of phenyl and alkyl of from 1 to 4 carbon atoms, inclusive, $R_2$ is alkyl of from 1 to 4 carbon atoms, inclusive, $R_3$ is selected from the class consisting of hydrogen and alkyl of from 1 to 4 carbon atoms, inclusive, and $R_4$ is selected from the class consisting of hydrogen, hydroxy, alkoxy of from from 1 to 4 carbon atoms, inclusive, and benzyloxy.

2. 2-(3-indolyl)-3-methyl-2,3-butanediol.
3. 2-methyl-3-(1-methyl-3-indolyl)-2,3-butanediol.
4. 1,1-diphenyl-2-(3-indolyl)-1,2-propanediol.
5. A compound having the formula:

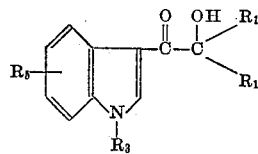

wherein $R_1$ is selected from the class consisting of phenyl and alkyl of from 1 to 4 carbon atoms, inclusive, $R_3$ is selected from the class consisting of hydrogen and alkyl of from 1 to 4 carbon atoms, inclusive, and $R_5$ is selected from the class consisting of hydrogen, alkoxy of from 1 to 4 carbon atoms, inclusive, and benzyloxy.

6. 2-hydroxy-1(3-indolyl)-2-methyl-1-propanone.
7. 2 - hydroxy - 1 - (1 - methyl - 3 - indolyl) - 2-methyl-1-propanone.
8. Hydroxydiphenylmethyl 3-indolyl ketone.
9. Hydroxydiphenylmethyl 1-methyl-3-indolyl ketone.
10. A process which comprises reacting a compound having the formula:

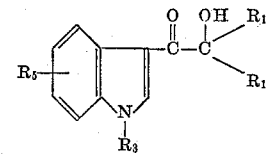

wherein $R_1$ is selected from the class consisting of phenyl and alkyl of from 1 to 4 carbon atoms, inclusive, $R_3$ is selected from the class consisting of hydrogen and alkyl of from 1 to 4 carbon atoms, inclusive, and $R_5$ is selected from the class consisting of hydrogen, alkoxy of from 1 to 4 carbon atoms, inclusive, and benzyloxy, with an alkyl lithium compound $R_2Li$ wherein $R_2$ is alkyl of from 1 to 4 carbon atoms, inclusive, in the presence of an inert organic solvent to obtain a compound having the formula:

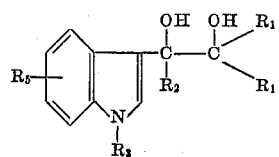

wherein $R_1$, $R_2$, $R_3$, and $R_5$ have the significance defined above.

11. A process which comprises reacting a compound having the formula:

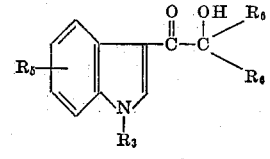

wherein $R_3$ is selected from the class consisting of hydrogen and alkyl of from 1 to 4 carbon atoms, inclusive, $R_5$ is selected from the class consisting of hydrogen, alkoxy of from 1 to 4 carbon atoms, inclusive, and benzyloxy, and $R_6$ represents alkyl of from 1 to 4 carbon atoms, inclusive, with an alkylmagnesium halide $R_2MgHal$, wherein $R_2$ is alkyl of from 1 to 4 carbon atoms, inclusive, and Hal is a halogen atom, in the presence of an inert organic solvent to obtain a compound having the formula:

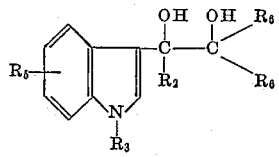

wherein $R_2$, $R_3$, $R_5$, and $R_6$ have the significance defined above.

12. A process which comprises reacting a compound having the formula:

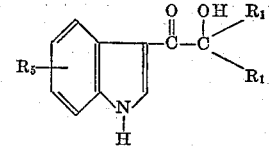

wherein $R_1$ is selected from the class consisting of phenyl and alkyl of from 1 to 4 carbon atoms, inclusive, and $R_5$ is selected from the class consisting of hydrogen, alkoxy of from 1 to 4 carbon atoms, inclusive, and benzyloxy, with a reagent selected from the class consisting of (a) a dialkyl sulfate $(R_7)_2SO_4$ and (b) an alkyl halide $R_7Hal$, wherein $R_7$ is alkyl of from 1 to 4 carbon atoms, inclusive, to obtain a compound having the formula:

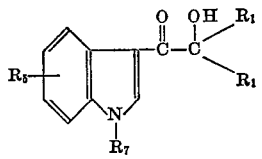

wherein $R_1$, $R_5$, and $R_7$ have the significance above defined, and reacting the latter compound with an alkyl lithium compound $R_2Li$, wherein $R_2$ is alkyl of from 1 to 4 carbon atoms, inclusive, in the presence of an inert organic solvent to obtain a compound having the formula:

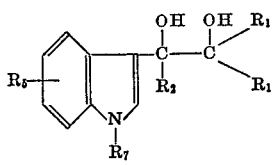

wherein $R_1$, $R_2$, $R_5$, and $R_7$ have the significance above defined.

13. A process which comprises reacting a glyoxylate having the formula:

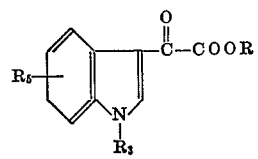

wherein R is alkyl, $R_3$ is selected from the class consisting of hydrogen and alkyl of from 1 to 4 carbon atoms, inclusive, and $R_5$ is selected from the class consisting of hydrogen, alkoxy of from 1 to 4 carbon atoms, inclusive, and benzyloxy, with an alkylmagnesium halide $R_6MgHal$ wherein $R_6$ is alkyl of from 1 to 4 carbon atoms, inclusive, and Hal represents halogen, in an inert organic solvent, the alkylmagnesium halide being employed in the reaction in a proportion between about 7 and about 9 moles per mole of the glyoxylate, to obtain a compound having the formula:

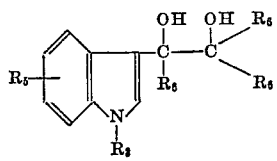

wherein $R_3$, $R_5$, and $R_6$ have the significance above defined.

14. A process which comprises reacting a compound having the formula:

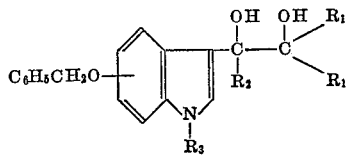

wherein $R_1$ is selected from the class consisting of phenyl and alkyl of from 1 to 4 carbon atoms, inclusive, $R_2$ is alkyl of from 1 to 4 carbon atoms, inclusive, and $R_3$ is selected from the class consisting of hydrogen and alkyl of from 1 to 4 carbon atoms, inclusive, with hydrogen in the presence of a palladium catalyst to obtain a compound having the formula:

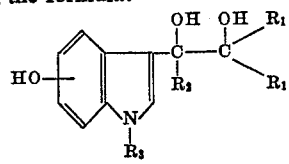

wherein $R_1$, $R_2$, and $R_3$ have the significance above defined.

15. A process which comprises reacting a compound having the formula:

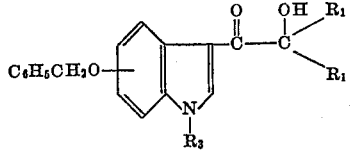

wherein $R_1$ is selected from the class consisting of phenyl and alkyl of from 1 to 4 carbon atoms, inclusive, and $R_3$ is selected from the class consisting of hydrogen and alkyl of from 1 to 4 carbon atoms, inclusive, with an alkyl lithium compound $R_2Li$, wherein $R_2$ is alkyl from 1 to 4 carbon atoms, inclusive, in the presence of an inert organic solvent, to obtain a compound having the formula:

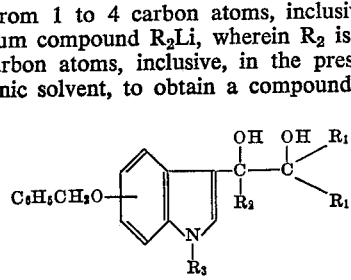

wherein $R_1$, $R_2$, and $R_3$ have the significance defined above, and reacting the latter compound with hydrogen in the presence of a palladium catalyst to obtain a compound having the formula:

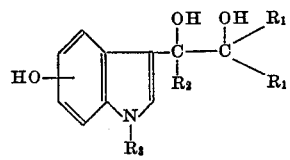

wherein $R_1$, $R_2$, and $R_3$ have the significance hereinbefore defined.

16. A process which comprises reacting a compound having the formula:

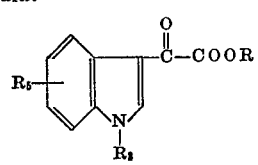

wherein R represents alkyl, $R_3$ is selected from the class consisting of hydrogen and alkyl of from 1 to 4 carbon atoms, inclusive, and $R_5$ is selected from the class consisting of hydrogen, alkoxy of from 1 to 4 carbon atoms, inclusive, and benzyloxy, with a Grignard reagent $R_1MgHal$, wherein $R_1$ is selected from the class consisting of phenyl and alkyl of from 1 to 4 carbon atoms, inclusive, and Hal represents halogen, in the presence of an inert organic solvent, to obtain a compound having the formula:

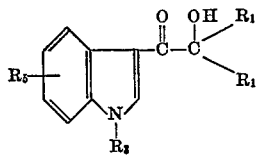

References Cited in the file of this patent
Brown et al.: J. Chem. Soc., pages 3172–3176 (1952).